Nov. 11, 1924.
A. URQUHART
1,514,641
CHUCK
Filed April 30, 1923
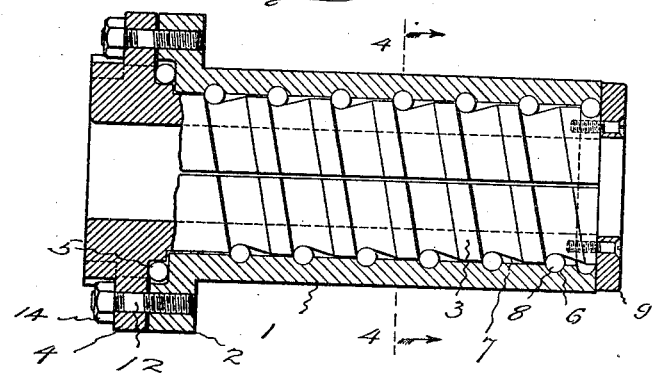
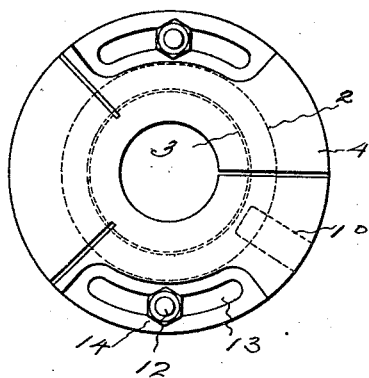
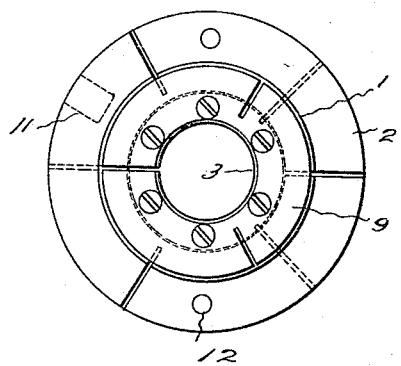
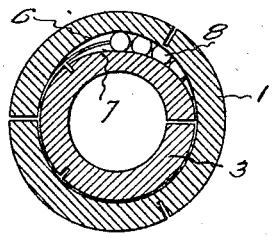
INVENTOR
Alexander Urquhart
by Harry P. Williams Patented Nov. 11, 1924.

1,514,641

UNITED STATES PATENT OFFICE.

ALEXANDER URQUHART, OF DERBY, CONNECTICUT.

CHUCK.

Application filed April 30, 1923. Serial No. 635,511.

*To all whom it may concern:*

Be it known that I, ALEXANDER URQUHART, a citizen of the United States, residing at Derby, in the county of New Haven and State of Connecticut, have invented a new and useful Improvement in Chucks, of which the following is a specification.

This invention relates to those devices which are capable of expansion for entering bores and holding work placed over them and also capable of contraction for holding work entered into them.

The object of this invention is to provide a simple, cheap, powerful and easily manipulated article which can be used as an expanding arbor, a contracting chuck, an adapter for turning machines, or a bearing bushing, as desired.

This object is attained by fitting a contractile sleeve having an exterior spiral groove within a surrounding expansible sleeve having an interior spiral groove, which grooves are so shaped and occupied by such means that rotating one sleeve with relation to the other will tend to cause the expansion of the outer sleeve and tend to cause the contraction of the inner sleeve, means being provided whereby the sleeves may be locked together in any desired relation.

In the accompanying drawings Fig. 1 shows a longitudinal section of an article that embodies the invention. Fig. 2 shows a view of one end of the article. Fig. 3 is a view looking at the other end. Fig. 4 is a transverse section.

The outer sleeve 1 is cylindrical and it has a flanged head 2 at one end. The inner sleeve 3 is cylindrical and it has a flanged head 4 adjacent to the head of the outer sleeve. Thrust bearings 5 are arranged between the heads for sustaining any longitudinal pressure between them. The outer sleeve and its head is slitted longitudinally at different localities and for various lengths in order that this sleeve may be expanded. The inner sleeve is slitted longitudinally at different localities and for various lengths in order that this sleeve may be contracted.

In the inner wall of the outer sleeve is a spiral groove 6 and in the exterior surface of the inner sleeve is a spiral groove 7. One of these grooves is substantially semi-circular in cross section, as is the groove in the outer sleeve, and the other of the grooves is wedge-shaped in cross section, as is the groove in the inner sleeve. These grooves are complementary and are completely filled by balls 8 approximately half of each ball extending into each groove substantially as shown and described in Patent #1,464,551 granted to me August 14, 1923. A ring 9 is fastened to the inner sleeve for retaining the balls in the grooves and this ring is split in order that it may contract with the inner sleeve. Holes 10 and 11 are made in the periphery of the heads for the application of spanner wrenches or other tools which may be used to rotate the sleeves with relation to each other. In order to retain the sleeves from relative endwise movement screw studs 12 are turned into the head of the outer sleeve through slots 13 in the head of the inner sleeve, and on the outside these screw studs are provided with nuts 14 which may be tightened so as to lock the sleeves together against relative rotation.

When one sleeve is rotated relatively to the other in one direction, which can be accomplished by any suitable means, the balls are forced into the shallower sections of the wedge-shaped groove. This tends to expand the outer sleeve and to contract the inner sleeve very powerfully, which expansion and contraction is uniform throughout the lengths of the sleeves. When the relative rotation is reversed the balls are carried back into the deeper sections of the wedge groove and permit the sleeves to resume their normal state. If, when the sleeves are expanded or contracted and the nuts are tightened on the screw studs, the parts will be positively locked together so as to remain in that condition.

With this construction a device is provided that may be made to firmly grip any piece, within the range of the structure, that is put into the bore of the inner sleeve, or may be made to securely hold any piece, within the range of the structure, that is placed on the outside of the outer sleeve. For example, the chuck may be placed upon the arbor or shaft of a machine tool and a piece of work placed on the chuck and then the sleeves rotated relatively to each other so that the inner sleeve will grip the arbor and the outer sleeve will grip the work. This action takes place in such manner that not only are the parts tightly secured together by a single operation, but the work is automatically centralized on the arbor. The structure can if desired be used as a bushing between two elements which it is desired to lock together, or as a bearing bushing in which the outer element will have a running fit on the outer sleeve or the inner element will have a running fit in the bore of the inner sleeve. The expansion and contraction of the sleeves is made in such a manner that the proper adjustment can be powerfully and exactly made to the space intermediate the elements between which the chuck is placed.

The invention claimed is:—

1. A chuck comprising an expansible outer sleeve, a contractible inner sleeve, and means between the sleeves which by the rotation of one sleeve with relation to the other tends to expand the outer sleeve and contract the inner sleeve.

2. A chuck comprising an expansible outer sleeve, a contractible inner sleeve, means between the sleeves which by the rotation of one sleeve with relation to the other tends to expand the outer sleeve and contract the inner sleeve, and means for locking the sleeves against independent rotary movement.

3. A chuck comprising a longitudinally slitted outer sleeve, a longitudinally slitted inner sleeve, and means between the sleeves which by the rotation of one sleeve with relation to the other tends to radially separate the sleeves.

4. A chuck comprising a longitudinally slitted outer sleeve, a longitudinally slitted inner sleeve, a spiral groove in the interior of the outer sleeve, a spiral groove on the exterior of the inner sleeve, one of said grooves having a wedge-shaped cross section, and balls occupying said grooves.

5. A chuck comprising a longitudinally slitted outer sleeve, a longitudinally slitted inner sleeve, a spiral groove in the interior of the outer sleeve, a spiral groove in the exterior of the inner sleeve, one of said grooves having a wedge-shaped cross section, balls occupying said grooves, screw studs extending from one sleeve through slots in a part of the other sleeve, and nuts on the studs for locking the sleeves together.

6. A chuck comprising a longitudinally slitted outer sleeve with a flanged head, a longitudinally slitted inner sleeve with a flanged head, means between the sleeves which by the rotation of one sleeve with relation to the other tends to radially separate the sleeves, screw studs projecting from one head through slots in the other head, and nuts on said studs and adapted to lock the sleeve heads together.

7. A chuck comprising a longitudinally slitted outer sleeve with a flanged head, a longitudinally slitted inner sleeve with a flanged head, a spiral groove with a semi-circular cross section in the interior of the outer sleeve, a spiral groove with a wedge-shaped cross section on the exterior of the inner sleeve, balls occupying said grooves, screw studs extending from the head of the outer sleeve through slots in the head of the inner sleeve, and nuts on said studs for locking the heads of the sleeves together.

ALEXANDER URQUHART.